United States Patent [19]
Christensen et al.
[11] 3,920,976
[45] Nov. 18, 1975

[54] INFORMATION STORAGE SECURITY SYSTEM

[75] Inventors: Bruce A. Christensen; George A. Raymond, both of Minneapolis, Minn.

[73] Assignee: Sperry Rand Corporation, New York, N.Y.

[22] Filed: Aug. 19, 1974

[21] Appl. No.: 498,824

[52] U.S. Cl.................... 235/153 AM; 340/174 ED; 340/172.5
[51] Int. Cl........................ G11c 29/00; G06f 11/12
[58] Field of Search................. 235/153 AM, 153 R; 340/146.1 AL, 146.1 AV, 146.1 C, 146.1 F, 146.1 R, 174 ED, 172.5; 444/1

[56] References Cited

UNITED STATES PATENTS

| | | | |
|---|---|---|---|
| 3,231,858 | 1/1966 | Tuomenoksu et al. | 235/153 AM |
| R27,251 | 12/1971 | Amdahl et al. | 340/172.5 |

*Primary Examiner*—R. Stephen Dildine, Jr.

*Attorney, Agent, or Firm*—Kenneth T. Grace; Thomas J. Nikolai; Marshall M. Truex

[57] ABSTRACT

A system for restricting access to information stored in the memory of a data processing system to those persons possessing the proper security identity code is disclosed. The system includes an encoding network for generating a check symbol that is formed of a plurality of parity checking bits. The parity checking bits are encoded from the information word portion of the binary word that is to be written into and then read out of a specified address of an information store from the address word that defines the address in the information store in which the binary word is to be written into or read out of, and from the security identity code that authorizes the user to have access to the specified address of the information store. The parity checking bits perform error-correction and error-detection on the information word, determine if a user is an authorized user by determining if his security identity code is the correct security identity code for the specified address in the information store, and determine if the accessed address in the information store is the correct address.

2 Claims, 3 Drawing Figures

INFORMATION STORAGE SECURITY SYSTEM

BACKGROUND OF THE INVENTION

The present invention is directed to that class of the data processing art that includes error correcting coding schemes for the determination of errors in multibit words transferred between the main memory or information store and the remaining elements of a data processing system. In particular, it is considered to be an improvement type invention over that of the L. S. Tuomenoksa, et al. U.S. Pat. No. 3,231,858. In such patent there is depicted an information store which contains a plurality of binary words each of which comprises a plurality of elements. Each of these binary words is stored at a definite location or address in the information store which address is also representable in binary form. A source of address words couples address words to the information store, to an error detecting and correcting circuit and to an encoding network. Upon each occurrence of an address word from the address information source, the information store transmits the binary work stored at the corresponding address location to the error detecting and correcting circuit. The transmitted binary word comprises both information word bits and parity checking bits which perform an encoding over the information word and the address word although the address word is not actually contained in the stored binary words. When the stored binary word read out from the information store and the address word from the source of address information are concurrently contained in the error detection and correction circuit, the parity of the binary word received from the information store is rechecked. In the example given, any single error present in either the information word or the parity checking bits thereof is corrected and an output results. On the other hand, a double error or error in the address word causes a sequential readdressing of the store.

The information word and the parity checking bits stored at each address of the information store are supplied thereto by an encoding network during the read-in or write process. When a particular information word supplied by the information source is applied to the encoding network, along with a corresponding address word supplied by the source of address information, the encoding network computes the parity checking bits according to the particular encoding employed, and transmits the information word and the parity checking bits to the appropriate storage address, while not transmitting the address word. Thus, the parity checking bits are used for error-correction and error-detection of the information word while an error in the address word causes a readdressing of the information stored, i.e., the binary word. The present invention incorporates within such prior art error correcting system a security system for restricting access to information words stored in the information store to those persons or users possessing the proper security identity code.

SUMMARY OF THE INVENTION

In the preferred embodiment of the present invention there is depicted an information store which contains a plurality of binary words each of which comprises a plurality of elements. Each of these binary words is stored in a definite location or address in the information store which address is also representable in address bits. A source of address information couples address bits to the information store, to an error detecting and correcting circuit and to an encoding network. Also provided is a source of a security identity code that independently couples security identity code bits provided by the user to the encoding network and to the error detecting and correcting circuit. The transmitted binary word comprises both information bits and parity checking bits which perform an encoding over both the information bits, the address bits and the security identity code bits, although the address bits and the security identity code bits are not actually contained in the stored binary words.

When the stored binary word read from the information store, the address word from the address information source, and the security identity code from the security identity code source are concurrently contained in the error detection and correction circuit, the parity of the binary word received from the information store is rechecked. Depending on the code used, one or more errors present in the information word is corrected and an output results. On the other hand, if an error or errors in the address word or the security identity code is detected, no output results.

The information word and the parity checking bits that are stored at each address of the information store are supplied thereto by the encoding network during the write process. When a particular information word supplied by the information source is applied to the encoding network, along with the corresponding address word supplied by the source of address information and the corresponding security identity code supplied by the security identity code source, the encoding network computes the parity checking bits according to the particular encoding employed, and transmits the information word and the parity checking bits to the appropriate storage address. This system then provides for not only the error-correction and error-detection of the prior art but also incorporates a security identity code that is further encoded within the parity checking bits that are stored in the information store along with the information word such that access to any particular address in the information store is limited to those users having the correct security identity code specified for that address.

DESCRIPTION OF THE PRIOR ART

Figure 1:
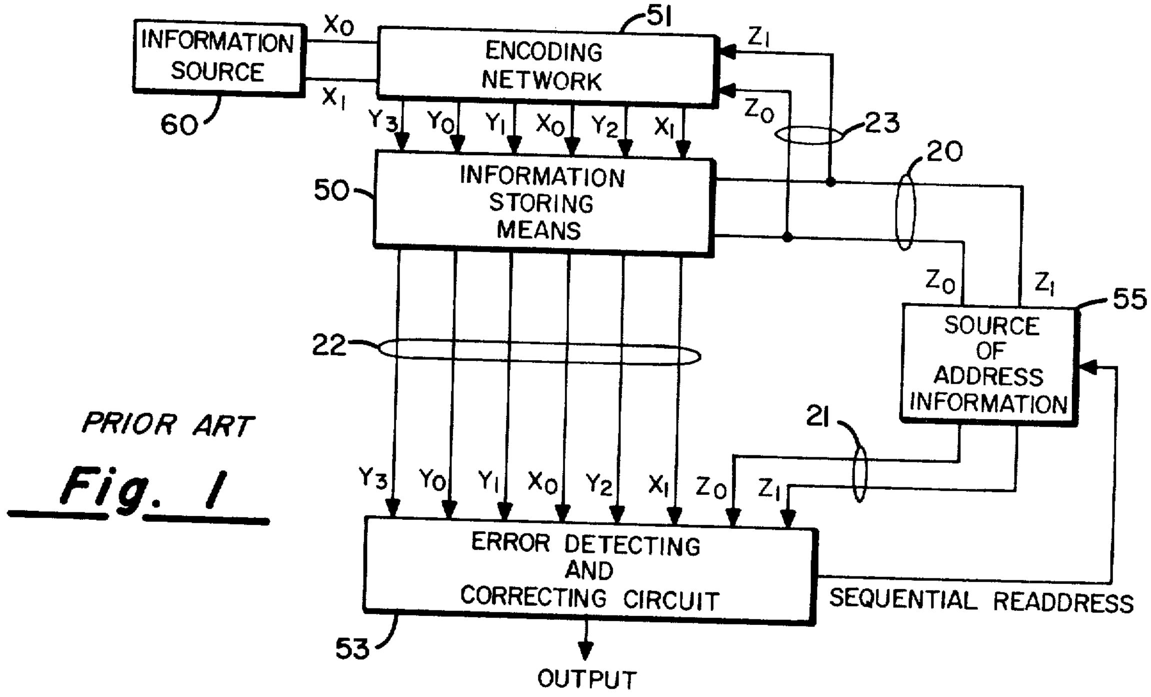
FIG. 1 is a block diagram of a prior art information storage error correction system.

Referring now to FIG. 1, there is illustrated the prior art system of the Tuomenoksa, et al., U.S. Pat. No. 3,231,858, in which there is illustrated an information store 50 which contains a plurality of binary words each of which comprises a plurality of elements. Each of these binary words is stored at a definite location or address which is also representable in binary form. A source 55 of address information is shown as directing address words independently to error detecting and correcting circuit 53 and also to information store 50 and encoding network 51 along leads 21, 20 and 23, respectively.

Upon each occurrence of an address word from the source 55, the information store 50 transmits the binary word stored at the corresponding address location to the error detecting and correcting circuit 53 along a plurality of leads 22. The transmitted binary word comprises both information bits and parity checking bits which perform an encoding over both the information word and the address word, although the address word is not actually contained in the stored binary words. Although the encoding may be any one of the many detecting and correcting codes well known in the art, the so-called Hamming code, which is described in detail in the Hamming, et al., Reissue U.S. Pat. No Re. 23,601, is the code used throughout in the interest of being specific and definite.

When the stored information read-out from the store 50 and the address word from the source 55 are concurrently contained in the error detection and correction circuit 53, the parity of the binary word received from the store 50 is rechecked. Any single error present in either the information word or the parity checking bits thereof is corrected and an output results. On the other hand, a double error or an error in the address word causes a sequential readdressing of the store 50.

The information word and the parity checking bits stored at each address of the store 50 are supplied thereto by an encoding network 51 during the read-in or write process. When a particular information word supplied by information source 60 is applied to the encoding network 51, along with the corresponding address word supplied by the source of address information 55, the encoding network 51 computes the parity checking bits according to the particular encoding employed, and transmits the information word and the parity checking bits to the appropriate storage address, while not transmitting the address word.

DESCRIPTION OF THE PREFERRED EMBODIMENTS

Figure 2:
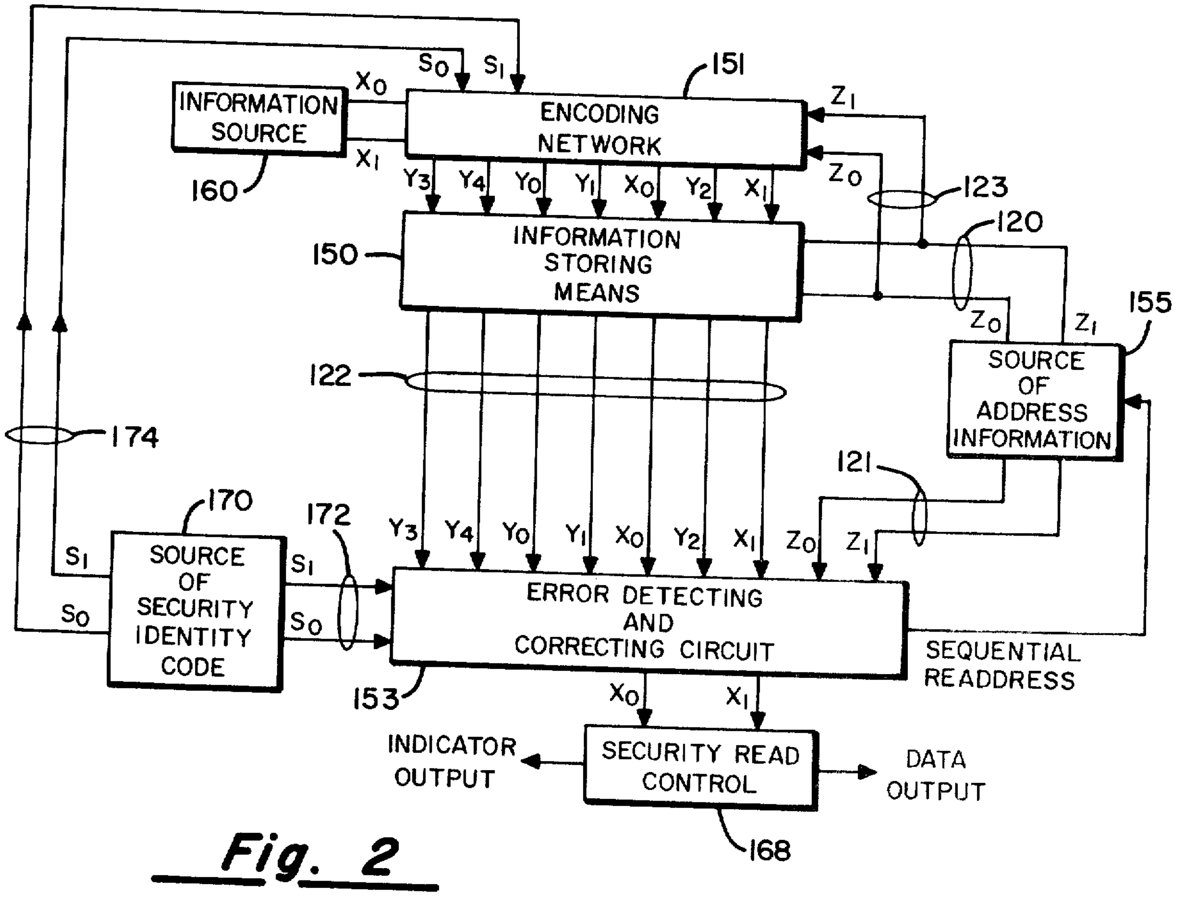
FIG. 2 is a block diagram of an information storage security system incorporating the present invention.

Referring now to FIG. 2, there is illustrated an information storage security system of the present invention in which there is illustrated an information store 150 which contains a plurality of binary words each of which comprises a plurality of elements, the composition of which will be described hereinafter. This information store 150 may comprise, for example, a semiconductor memory, all well known in the art. Each of these binary words is stored at a definite location or address which is also representable in binary form. A source 155 of address information is shown as directing address words independently to an error detecting and correcting circuit 153 and also to an information store 150 and an encoding network 151, which are more particularly considered hereinafter, along leads 121, 120 and 123, respectively. Further, a source 170 of security identity codes is seen as directing security identity codes independently to error detecting and correcting circuit 153 and to encoding network 151, along leads 172 and 174, respectively.

Upon each occurrence of an address word from source 155, information store 150 transmits the binary word stored at the corresponding address location to detecting and correcting circuit 153 along a plurality of leads 122. The transmitted binary word comprises both an information word and parity checking bits which perform an encoding over the information word, the security identity code and the address word, although the security identity code and the address word are not actually contained in the stored binary words. Although the encoding may be any one of the many detecting and correcting codes well known in the art, the so-called Hamming code, which is described in detail in the aforecited reissue patent, will be used throughout in the interest of being specific and definite.

When the stored information or binary word read-out from store 150, the address word from source 155 and the security identity code from source 170 as supplied by a user of the system are concurrently contained in error detection and correction circuit 153, the parity of the binary word received from store 150 is rechecked. Any single error present in the information word thereof is corrected and an output results. On the other hand, if an error is detected in the security identity code, or the address word or if a double error occurs in the information word, output is prevented by the security read control 16B and an indication of this condition is given on the indicator output.

The information word and the parity checking bits stored at each address of store 150 are supplied thereto by an encoding network 151 during the read-in or write process. When a particular information word supplied by information source 150 is applied to encoding network 151, along with the corresponding address word supplied by the source of address information 155, and the security identity code supplied by source 170, the encoding network 151 computes the parity checking bits according to the particular encoding employed, and transmits the information word and the parity checking bits to the appropriate storage address, while not transmitting the address word or the security identity code.

The physical embodiment of the circuit 153 and the network 151 may be of the type illustrated in the noted Hamming, et al, Reissue Patent or any modification thereof which may be accomplished by one skilled in the art. Also, the embodiments may be synthesized by a straight-forward application of the digital logic required, as taught by any standard text on digital logic. See, for example, "Arithmetic Operations in Digital Computers" by R. K. Richards, Van Nostrand Publishing Company, 1955. With the structure of FIG. 2 in mind, a first specific example illustrating aspects of the present invention will now be presented hereinbelow.

Assume, for example, that information store 150 embodies a 2 × 2 matrix memory, thereby containing four storage addresses. In binary form, the address word is therefore expressible by two binary digits or bits, henceforth denoted by $Z_0$ and $Z_1$. Also, the security identity code will be assumed to contain two information bits denoted in turn by $S_0$ and $S_1$.

Also, the binary word stored at each location will be assumed to contain two information bits, denoted in turn by $X_0$ and $X_1$. The parity check must, according to the principles of this invention, be performed on the two information bits $X_0$ and $X_1$ plus the two address bits $Z_0$ and $Z_1$, plus the two security identity code bits, or the resulting six bits or elements. Hamming has shown (see Table I, page 153, the Bell System Technical Journal, April 1950, or the noted Reissue Patent) that for six elements to be encoded, and to possess a single error correction capability, four parity bits are necessary. These will be denoted by $Y_0$, $Y_1$, $Y_2$ and $Y_3$. The value of each of these Y bits may be obtained from the set of formulae which will generate the Hamming code, wherein:

$$Y_0 = X_0 + X_1 + Z_1 + S_0$$
$$Y_1 = X_0 + Z_0 + Z_1 + S_1$$
$$Y_2 = X_1 + Z_0 + Z_1$$
$$Y_3 = S_0 + S_1$$

The plus sign shown in the above formulae indicates the modulo 2 sum, this being "Exclusive-Or" addition, that is, $Y = 0$ for an even number of 1's in the sum and $Y = 1$ for an odd number of 1's.

These sums are equivalent to placing $Y_0$, $Y_1$, $X_0$, $Y_2$, $Y_3$, $X_1$, $Z_0$, $Z_1$ in columns 1 through 5, respectively, and computing the Y values as indicated in the cited Bell System Technical Journal article or the Reissue Patent.

A set of assumed information words and security identity codes along with their address words and the resulting computed parity checking bits according to the computation definitions described hereinabove are presented in Table I below, wherein the additional parity checking bit $Y_4$ will be identified hereinbelow.

Thus, according to the principles described hereinbefore, only words formed from bits appearing in the two center columns $X_0$ and $X_1$ and four right-hand columns $Y_0$, $Y_1$, $Y_2$, and $Y_3$ of Table I are stored at the addresses indicated by the two columns $Z_0$ and $Z_1$.

Let the address $Z_0Z_1 = 10$, for example, be interrogated. The binary address 10 is sent from source 155 to the information store 150 and, also, to error detection and correction circuit 153. Upon reception of the 10 address, the store 150 sends the corresponding word 001111 corresponding to $X_0'X_1'Y_0'Y_1'Y_2'Y_3'$, respectively, of Table I. (The primes indicate that this is the read-out version of the stored values, the primed and the unprimed values being identical unless an error has occurred.)

When error detecting and correcting circuit 153 contains both this read-out information word and also the corresponding address word, the circuit computes the following parity rechecking modulo 2 sums $V_0$, $V_1$, $V_2$ and $V_3$ wherein:

$$V_3 = Y_3' + S_0 + S_1$$
$$V_2 = Y_2' + X_1' + Z_0 + Z_1$$
$$V_1 = Y_1' + X_0' + Z_0 + Z_1 + S_1$$
$$V_0 = Y_0' + X_0' + X_1' + Z_1 + S_0.$$

If no errors have occurred, each of the sums will equal 0. This is so because the respective Y's are augmented to the sums which were formerly used to compute them. Thus, if the sum for Y contained an odd number of 1's, *Y* would equal 1 and when this 1 value is added with the sum, the result of this Exclusive-Or addition is 0.

TABLE I

| SECURITY | | ADDRESS | | INFORMATION | | PARITY CHECKING BITS | | | | |
|---|---|---|---|---|---|---|---|---|---|---|
| $S_0$ | $S_1$ | $Z_0$ | $Z_1$ | $X_0$ | $X_1$ | $Y_0$ | $Y_1$ | $Y_2$ | $Y_3$ | $Y_4$ |
| 1 | 0 | 0 | 0 | 1 | 0 | 0 | 1 | 0 | 1 | 0 |
| 1 | 0 | 1 | 0 | 0 | 0 | 1 | 1 | 1 | 1 | 0 |
| 1 | 1 | 0 | 1 | 1 | 1 | 0 | 1 | 0 | 0 | 0 |
| 1 | 1 | 1 | 1 | 0 | 1 | 1 | 1 | 1 | 0 | 0 |

A similar result occurs for the value of V if the respective Y should have equaled 0. Thus, in the case we have chosen $$V_3 = 1 + 1 + 0 = 0$$
$$V_2 = 1 + 0 + 1 + 0 = 0$$
$$V_1 = 1 + 0 + 1 + 0 + 0 = 0$$
$$V_0 = 1 + 0 + 0 + 0 + 1 = 0.$$

The binary word $V_3V_2V_1V_0 = 0000$. This indicates that no error has occurred and, accordingly, an output results.

If, however, one of the stored elements has undergone an error in read-out or transmission, the binary word $V_3V_2V_1V_0$ indicates this fact and actually yields the position of the bit in error, where the bits designated $Y_0$, $Y_1$, $X_0$, $Y_2$, $X_1$, $Z_0$ and $Z_1$, $S_0$, $S_1$ correspond to the $V_3$, $V_2$, $V_1$, $V_0$ numbers 0001 through 1001 (decimals 1 through 9), respectively.

More specifically, in example chosen, suppose $X_0'$, the read-out value of the $X_0$ stored information bit had somehow erroneously been converted to a 1. The input to detection and correction network 153 would, therefore, be 101111 rather than 001111. Now, when the V parity checking sums are formed:

$$V_3 = 1 + 1 + 0 = 0$$
$$V_2 = 1 + 0 + 1 + 0 = 0$$
$$V_1 = 1 + 1 + 1 + 0 + 0 = 1$$
$$V_0 = 1 + 1 + 0 + 0 + 1 = 1.$$

The binary word $V_3V_2V_1V_0 = 0011$ (in decimal form equals 3), and thus the element $X_0$ is found to be in error and hence automatically corrected, and an output results.

Automatic single-error-correction operation as described above is employed where double errors are prohibited from occurring. If it is desirable or necessary to detect double errors and also correct single errors, the following modifications are performed. First, a fifth parity checking bit $Y_4$ is stored at each location in the store. This bit is also computed by encoding network 151 in accordance with the principles of an event parity check as noted hereinbefore by performing a modulo 2 sum over the $X_0$, $X_1$, $Y_0$, $Y_2$, $Y_3$, $S_0$ and $S_1$ bits, that is, $$Y_4 = X_0 + X_1 + Y_0 + Y_1 + Y_2 + Z_0 + Z_1 + S_0 + S_1.$$

The $Y_4$ is stored with the information word and parity checking bits from which it is derived. Also, an additional V function is computed in the error detecting and correcting circuit 153 in accordance with the equation $$V_4 = Y_4' + X_0' + X_1' + Y_0' + Y_1' + Y_2' + Z_0' + Z_1' + S_0' + S_1.$$

This $V_4$ function is necessary to recheck the parity of the $Y_4$ checking element. (Once again the primes indicate that the elements are the read-out versions of the information contained in information store 150.)

Security control over information to be stored in store 150 is accomplished by specifying a successful read operation using the proper security identity code as a prior requirement for writing into a desired address. The assigned security identity code and address location would, in this application, previously have been used to generate and store the proper parity checking bits at that desired address in store 150. Therefore, the read-out of a specified address would verify that the security identity code was valid for that address and the security read control 168 would, therefore, permit information to be written into the address.

Figure 3:
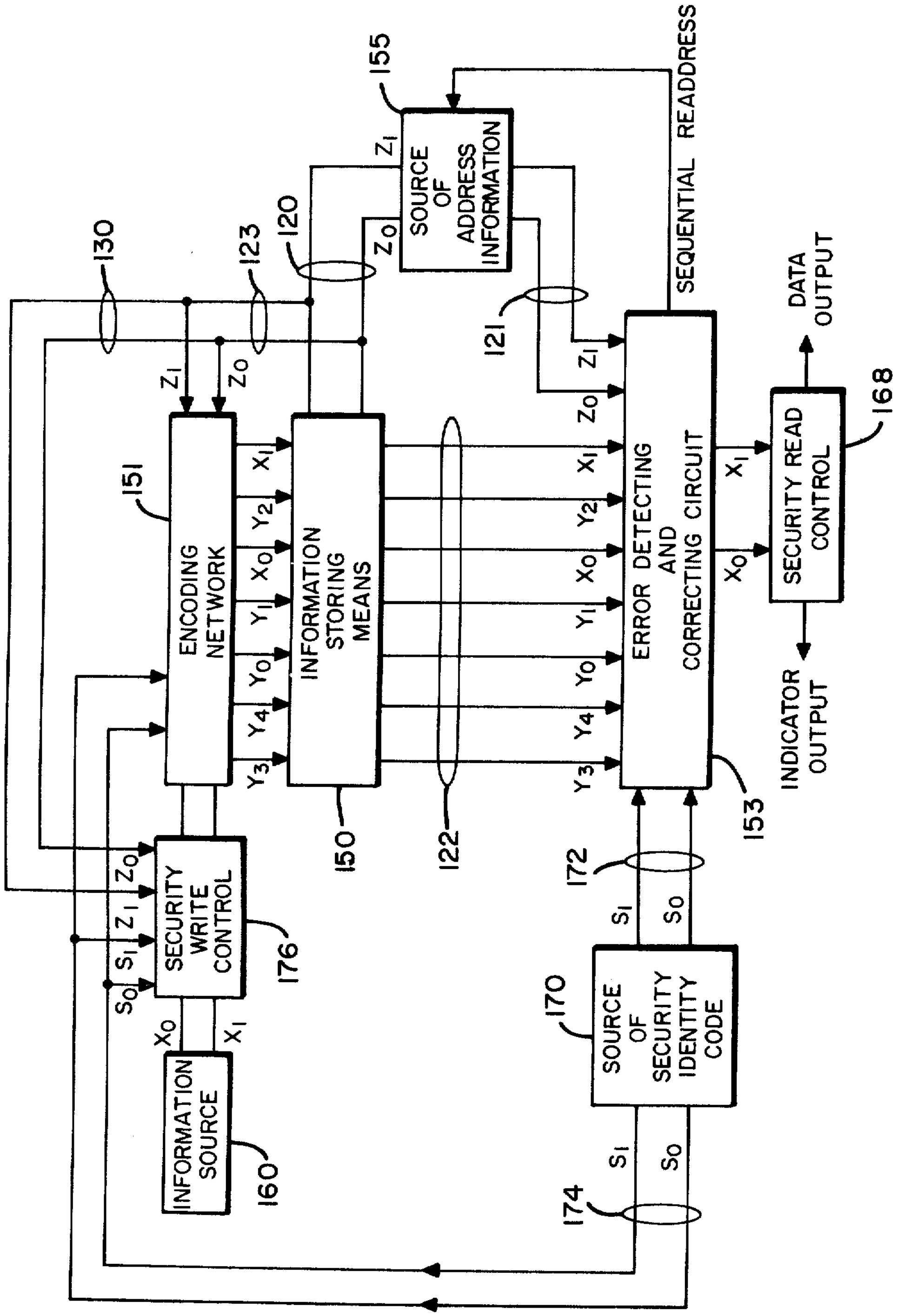
FIG. 3 is a block diagram of an information storage security system that is a modification of the system of FIG. 2.

An alternate implementation of this invention uses the security identity code in conjunction with the error detection circuitry 153 and the security read control 168, as shown in FIG. 3 and as previously described, to prevent reading from a specified address in store 150 without the use of the correct security identity code. A security write control 176 may be used to control writing into a specified address unless the correct security identity code is used. The security write control 176 contains an index of security identity codes related to each address. The address to be written into on lines 130 and the security identity code from source 170 of FIG. 3 are compared with this index by security write control 176 and if correct, security write control 176 permits the storing of the information from the source 160 to enter the encoding network 151. Succeeding steps are the same as in the previous description of this invention as illustrated in FIG. 2.

What is claimed is:

1. In an information storage error detection system, an information store which contains a plurality of binary words each of which contains information bits and parity check bits and is stored at an address in said information store which address is also represented by address bits, a source of address information that is independently coupled to the information store and to an error detecting and correcting circuit, an information source of information bits, an encoding network coupled to said information source for computing a plurality of parity check bits from said information bits and means coupling said information bits and said parity check bits to said information store to be stored as a binary word in a selected one of said addresses in which upon readout of said binary word, said error detecting and correcting circuit detects errors in said information bits, the improvement comprising:

a source of security identity code bits that are independently provided by a user, said source of security identity code bits coupled to said encoding network and to said error detecting and correcting circuit, said encoding network computing a plurality of parity check bits from said information bits and said security identity code bits and storing said information bits and said parity check bits in said information store at a selected one of said addresses, said error detecting and correcting circuit detecting errors in said binary word for indicating that, 1. said information bits are correct or include an error in one or more bits;
2. said security identity code bits that are independently provided by the user seeking access to the address defined by said address bits do or do not agree with the security identity code bits encoded in said parity checking bits.

2. In an information storage error detection system, an information store which contains a plurality of binary words each of which contains information bits and parity check bits and is stored at an address in said information store which address is also represented by address bits, a source of address information that is independently coupled to the information store and to an error detecting and correcting circuit, an information source of information bits, an encoding network coupled to said information source and said source of address information for computing a plurality of parity check bits and coupling said information bits and said parity check bits to said information store to be stored as a binary word in a selected one of said addresses in which upon readout of said binary word said error detecting and correcting circuit detects errors in said information bits and said address bits, the improvement comprising:

a source of security identity code bits that are independently provided by a user, said source of security identity code bits coupled to said encoding network and to said error detecting and correcting circuit, said encoding network computing a plurality of parity check bits from said information bits, said address bits and said security identity code bits and coupling said parity check bits to said information store to be stored therein with said information bits as said binary word, said error detecting and correcting circuit detecting errors in said binary word for:

1. correcting said information bits found to be in error and correctable, to the extent permitted by the code used,
2. indicating that said address bits do or do not define the address from which the binary word was read,
3. indicating that the security identity code bits provided by the user seeking access to the address defined by said address bits do or do not agree with the security identity code bits encoded in said parity checking bits.

* * * * *

UNITED STATES PATENT OFFICE

CERTIFICATE OF CORRECTION

PATENT NO. : 3,920,976

DATED : November 18, 1975

INVENTOR(S) : Bruce A. Christensen, et al

It is certified that error appears in the above-identified patent and that said Letters Patent are hereby corrected as shown below:

IN THE PRINTED PATENT

Column 5, Line 60, "$V_e = 1 + 1 + 0 = 0$" should be -- $V_3 = 1 + 1 + 0 = 0$ --.

Column 6, Line 34, "$V_4 = Y_4' + X_0' + X_1' + Y_0' + Y'_1 + Y_2' + Z_0' + Z_1' + S_0' + S_1$" should be

-- $V_4 = Y_4' + X_0' + X_1' + Y_0' + Y_1' + Y_2' + Z_0 + Z_1 + S_0 + S_1$ --.

Signed and Sealed this

*second* Day of *March 1976*

[SEAL]

*Attest:*

RUTH C. MASON
*Attesting Officer*

C. MARSHALL DANN
*Commissioner of Patents and Trademarks*